Oct. 18, 1955     C. O. GLASGOW     2,720,891
DIAPHRAGM VALVES

Filed March 5, 1951     2 Sheets-Sheet 1

Inventor
Clarence O. Glasgow
By Ahley & Ahley
ATTORNEYS

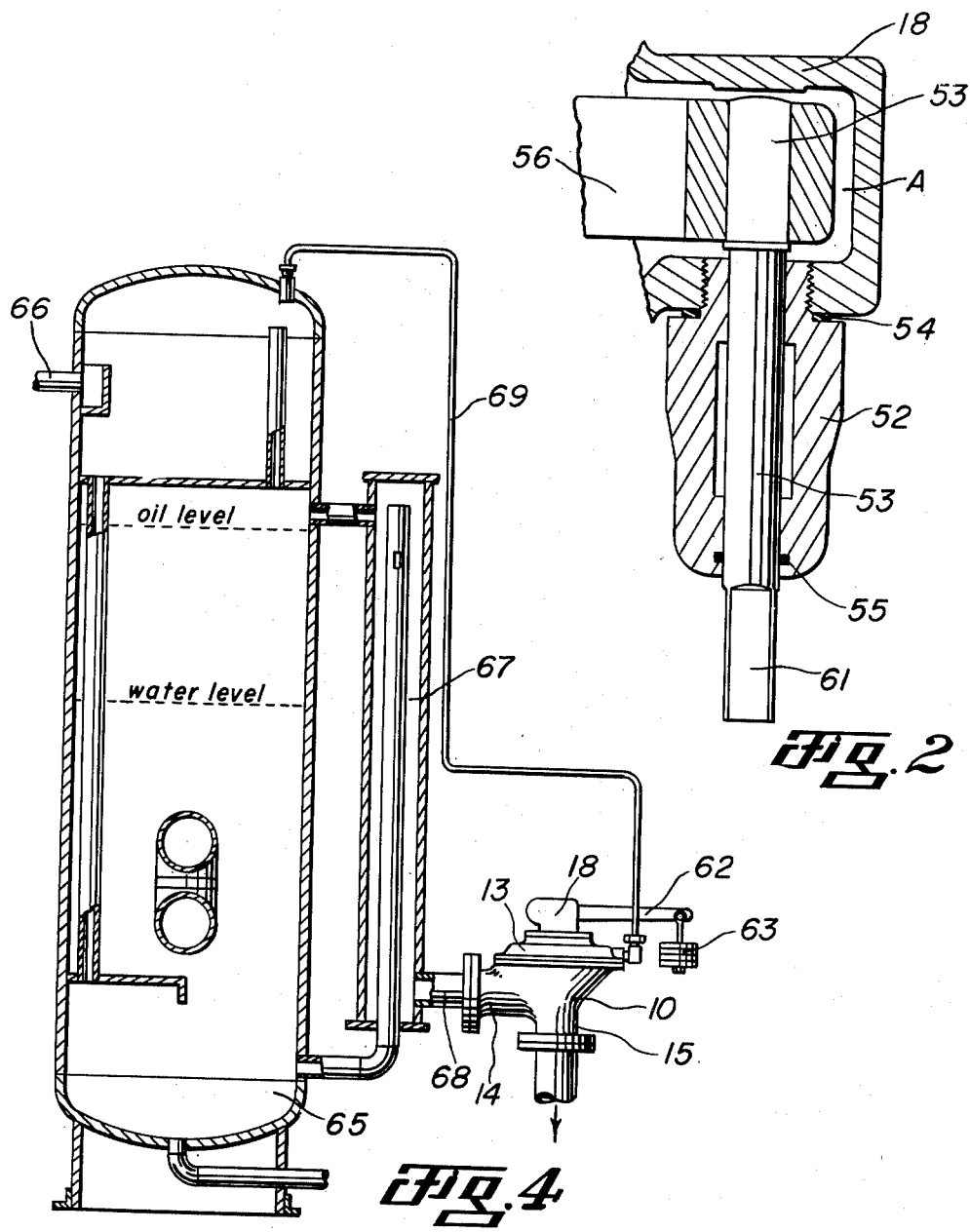

United States Patent Office 2,720,891
Patented Oct. 18, 1955

2,720,891

DIAPHRAGM VALVES

Clarence O. Glasgow, Tulsa, Okla., assignor to National Tank Company, Tulsa, Okla., a corporation of Nevada Application March 5, 1951, Serial No. 213,822

14 Claims. (Cl. 137—510)

This invention relates to new and useful improvements in diaphragm valves.

The invention is particularly concerned with a diaphragm operated valve adapted for use as a liquid level control valve in conjunction with vessels under pressure and from which liquid is to be drained while maintaining a pre-determined level of liquid within the vessel.

In the past, in providing for the drainage of liquid from pressure vessels through which a stream of liquid is flowing, it has been necessary to use a so-called balance valve having double seats and double valve elements, and to control the same by a separate diaphragm structure. These valves have not been completely balanced, and in actual use, have had numerous objectionable features.

It is therefore one object of this invention to provide an improved diaphragm valve which in a single unit provides both a balanced valve structure and an actuating diaphragm whereby the same may be connected to the outlet of a vessel and will function to withdraw liquid as the same accumulates within the vessel, thereby maintaining a substantially constant liquid level in the vessel at all times.

Yet another object of the invention is to provide an improved device of the character described having provision for complete equalization of all pressures, both up stream and down stream, whereby a completely balanced valve structure is provided.

A still further object of the invention is to provide an improved device of the character described having provision for proper seating of the valve disk upon the valve seat regardless of the fact that one or both elements may be slightly distorted or misalined, and having provision for more secure engagement of the valve seat by the valve disk under the influence of the external loading arrangement, regardless of whether the latter is a weight arm or a resilient member such as a spring.

A construction designed to carry out the invention will be hereinafter described together with other features of the invention.

Figure 1:
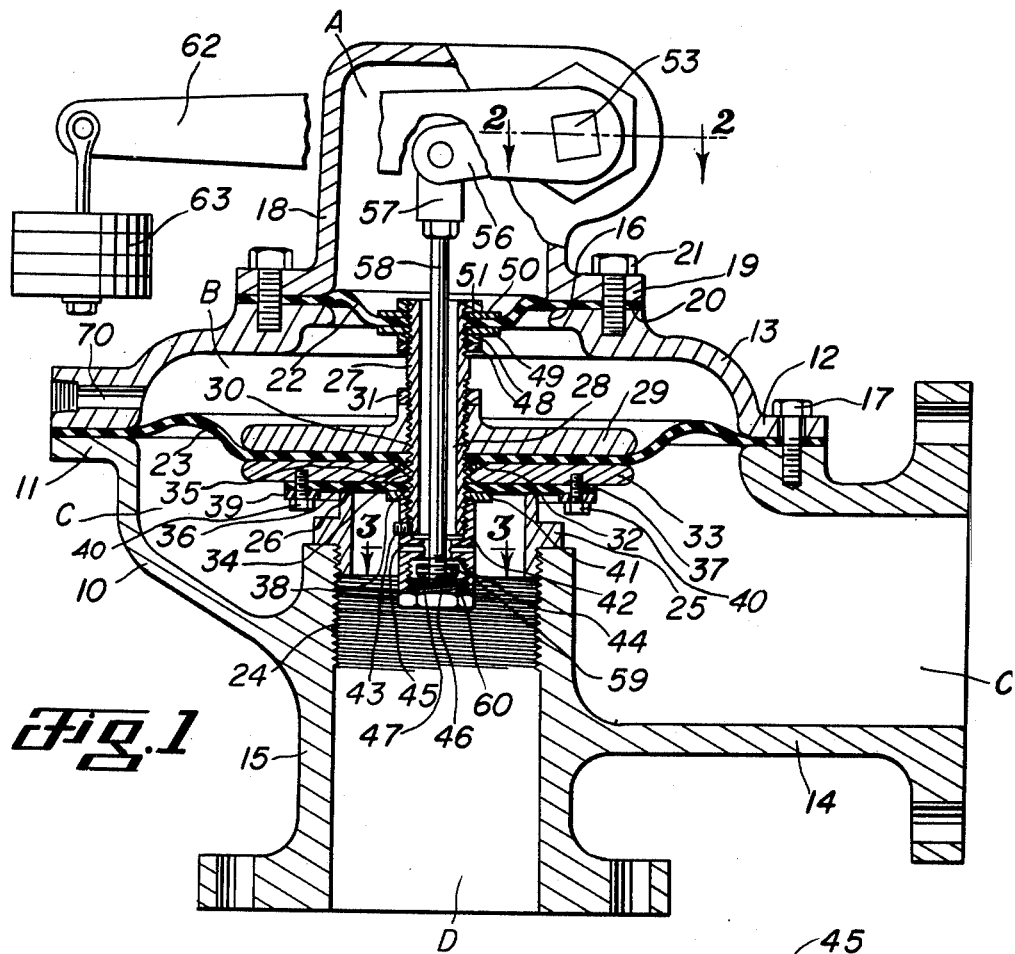
Figures 3, 5:
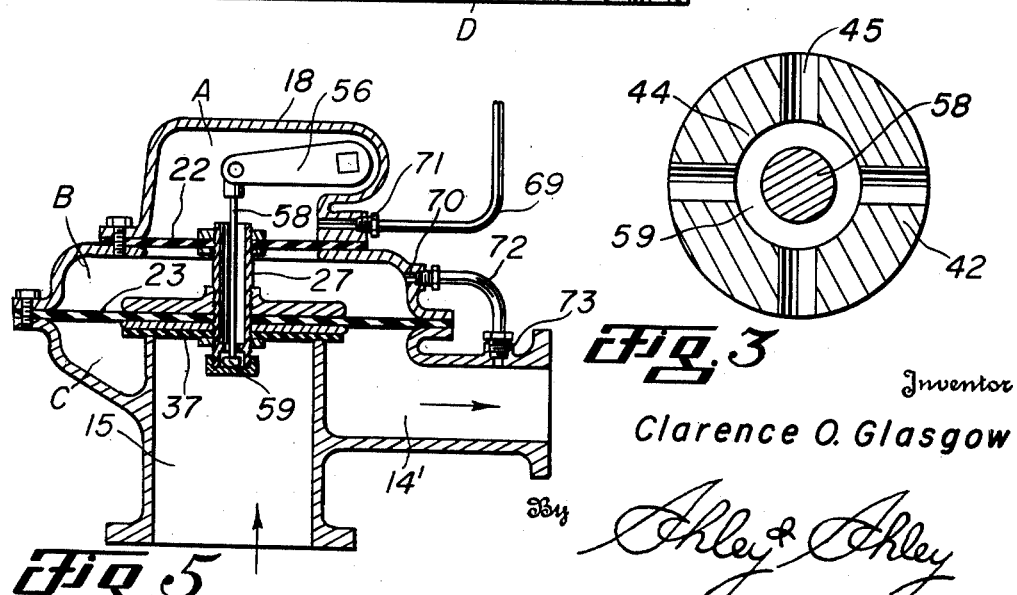

The invention will be more readily understood from a reading of the following specification and by reference to the accompanying drawing, wherein an example of the invention is shown, and wherein:

Fig. 1 is an enlarged, vertical, sectional view taken through a diaphragm valve constructed in accordance with this invention, Fig. 2 is a horizontal, cross-sectional view taken upon the line 2—2 of Fig. 1, Fig. 3 is a horizontal, cross-sectional view taken upon the line 3—3 of Fig. 1, Fig. 4 is a schematic view illustrating the utilization of the valve in conjunction with a pressure vessel, and Fig. 5 is a schematic view similar to Fig. 1 showing a modification of the valve.

In the drawings, the numeral 10 designates the lower half or section of a valve housing, the upper end of the housing section 10 being open and carrying an outwardly directed flange 11 for receiving the flange 12 of an upper housing section 13. The lower section 10 includes a flanged, laterally directed inlet 14 communicating with the interior and the open upper end of said lower section, and an axially-disposed, downwardly-directed, flanged outlet conduit 15 also opening into the hollow interior of the lower housing section. As shown in the drawings, the inlet and outlet conduits are preferably formed integrally with the housing section 10, and the entire unit may be cast or otherwise suitably formed.

The upper housing section 13 is in the form of a domed or dished cover plate having a central opening 16 in substantially vertical alinement with the outlet conduit 15 and being secured to the lower section 10 by suitable bolts 17 extending through the flanges 12 into the flanges 11. A hollow top housing 18 overlies the opening 16 and is provided with a flange 19 which is received upon a flat annular face 20 surrounding the opening 16. Suitable machine screws 21 extend through the flanges 19 into the upper portion of the section 13 and secure the top housing 18 thereto. A flexible upper diaphragm 22 has its marginal portion clamped between the flange 19 and the face 20 and extends across the opening 16, thereby defining an upper chamber A within the top housing 18 and an intermediate chamber B within the upper section 13 of the valve housing. A similar diaphragm 23 has its marginal portion clamped between the flanges 11 and 12 and separates the upper and lower sections of the valve housing, thus defining the lower wall of the section B and enclosing a section C within the lower section 10 of the valve housing. As will appear more fully hereinafter, the chamber C may be isolated from the passage or flow space of the outlet conduit 15, and the latter passage will be designated chamber D. It is to be noted that the chamber or annulus C extends annularly around the outlet fitting or conduit and has its upper boundary defined by the annular outer section of the diaphragm 23.

As shown in Fig. 1, the outlet conduit 15 projects axially upwardly into the interior of the lower valve housing section 10, terminating at a point spaced below the horizontal plane of the flange 11. Internal screw-threads 24 are provided at the upper end of the conduit 15, and a flanged valve seat ring 25 is screwed into the threaded section 24. The upper edge of the ring 25 is rounded to form a valve seat 26.

A screw-threaded tube 27 extends vertically through the centers of the diaphragms 22 and 23, the tube having an axial passage 28 which communicates between the chamber A above the diagram 22 and the chamber D below the diaphargm 23 and within the conduit 15. A plate or disk 29 is formed with a central screw-threaded opening 30 and is carried upon the screw-threaded tube 27 so as to engage or abut the upper surface of the diaphragm 23. As shown, the disk 29 is larger in diameter than the valve seat ring 25 but somewhat less in diameter than the interior of the lower housing section 10 whereby the outer portion of the diaphragm 23 is left free for flexing movements. A suitable lock ring 31 is also received upon the tube 27 above the plate 29 and snugly engages the upper surface of said plate.

The diaphragm 23 is provided with a central opening 32 through which the tube 27 extends, and a plate 33, of a diameter of the same magnitude as the disk 29, abuts the under side of the central portion of the diaphragm 23. The plate 33 also has a central opening 34 through which the tube 27 extends, the plate 33 being chamfered at 35 at the upper end of the opening 34 to receive a suitable resilient O-ring packing member 36. The ring 36 engages the tube 27 and the plate 33 and effectively seals the annular space therebetween.

A resilient valve disk 37, formed of "neoprene," or some other suitable material, has a central opening 38 through which the tube 27 extends, and is clamped to the under side of the plate 33 by a marginal clamping ring 39 and machine screws 40. The valve disk 37 is adapted to engage the valve seat 26 so as to close off the passage of the outlet conduit 15.

A washer 41 is received on the tube 27 below the valve disk 37, abutting the central portion of the latter and being held in position by a screw-threaded sleeve 42 received upon the lower end of the tube 27. As appears in the drawing, the sleeve 42 clamps the washer 41, the valve disk 37, the plate 33, and the diaphragm 23, against the underside of the disk 29. Thus, the tube 27 is securely anchored to the central portion of the diaphragm 23 and undergoes vertical movement therewith. A suitable set screw 43 extends through one wall of the sleeve 42 and engages the lower extremity of the tube 27 for preventing loosening of the sleeve 42 upon the lower end of said tube.

The sleeve 42 is provided with an annular, inwardly-directed flange 44 in its medial portion, and a plurality of radial ports 45 extend through said flange so as to provide communication between the inside and outside of the sleeve. A suitable plug 46 is screw-threaded into the lower end of the sleeve 42 for closing the same, the flat upper surface 47 of the plug forming a horizontal bearing surface spaced below the flange 44.

At the upper end of the tube 27, there are provided a pair of lock nuts 48 abutting the underside of a screw-threaded washer 49 received upon the screw threaded tube 27 and embracing the underside of the central portion of the diaphragm 22. A similar washer 50 is screw-threaded on the tube 27 so as to engage the upper surface of the diaphragm 22, and an additional lock nut 51 is carried on the extreme upper end of the tube 27 for securing the washer 50 in place. In this manner, the diaphragm 22 is also secured to the tube 27 whereby the tube, and the diaphragms 22 and 23 move upwardly and downwardly within the valve housing as a single unit.

As shown in Fig. 2, a shaft support 52 is screw-threaded into one side wall of the top housing 18, and a shaft or axle 53 is rotatably supported in the element 52. A suitable packing ring 54 seals the joint between the element 52 and the housing 18, while an O-ring 55 encircles the shaft 53 to seal the joint between said shaft and the support 52.

The support is offset to one side of the vertical axis of the tube 27, and a short lever arm 56, received upon the inner end of the shaft 53, extends between said shaft and the vertical plane of the tube 27. A block 57 is pivotally connected to the outer end of the arm 56, and an elongate rod 58 abuts the upper surface 47 of the plug 46, and a nut 59 is secured upon the lower end of the rod 58 by a suitable locking pin 60. The lower face of the nut 59 and the rod 58 are convex so that the same may readily rock over the upper surface 47 of the plug 46.

The outer end of the shaft 53, projecting outwardly beyond the support 52, is in the form of a polygonal pin 61, and a substantially horizontal weight bar or arm 62 is received on said pin. The bar 62 is of a substantial length and extends from the shaft 53 in the same general direction as the arm 56. Suitable adjustable weights 63 received upon the outer arm of the bar 62 thus urge the bar to swing downwardly, simultaneously causing the arm 56 to swing downwardly within the housing 18 so as to urge the rod 58 against the plug 46. Obviously, the force exerted by the weights 63 thus tend to urge the tube 27 and the diaphragms 22 and 23 downwardly within the valve housing. Manifestly, this action urges the valve disk 37 downwardly into snug engagement with the valve seat 26 effectively closing off communication between the inlet 14 and the outlet 15.

One example of the utilization of this diaphragm valve is illustrated in Fig. 4 of the drawings, wherein there is shown an emulsion treater 65 into which a well flow stream is entering by pipe 66. Within the emulsion treater, the well stream is separated into oil, water and gas, and it is, of course, necessary that the water and clean oil be drawn off as they accumulate so that a relatively constant volume of clean oil and water is maintained within the emulsion treater. It is normally desirable to maintain a substantially constant water level in a vessel of this type, and for this purpose, a conventional siphon-tube or water leg arrangement 67 is employed. The valve shown in Fig. 1 is connected to the outlet 68 of the water leg 67. There is also provided a gas pressure equalizing line 69 connected between the upper end of the treater 65 and a screw-threaded port 70 extending through the flange 12 into the chamber B within the upper section 13 of the valve housing.

The water within the outlet 68 will of course be under the pressure of whatever hydrostatic head is present, and will also be under the pressure of the body of gas in the upper portion of the treater. These combined pressures, which will be designated hydrostatic pressure and gas pressure, will be exerted through the inlet 14 into the chamber C and will act upwardly upon the outer portion of the diaphragm 23 tending to move the diaphragm upwardly and lift the valve disk 37 from the seat 26. At the same time, the gas pressure will be acting through the equalizing line 69 into the chamber B and will place a downward thrust over the entire upper surface of the diaphragm 23, thus equalizing the upward thrust exerted upon the outer portion of the diaphragm by the gas pressure acting upon the body of water. In addition, there will be a downward thrust upon the central portion of the diaphragm 23 created by this gas pressure.

The effective area of the diaphragm 22 is equal to the effective area of the valve seat 26 so that pressure acting in the chamber B will exert an upward force upon the diaphragm 22 equal and opposite to the downward force exerted upon the central portion of the diaphragm 23. Because of the characteristics of pressure diaphragms, the physical area of the diaphragm 22 may differ from the cross-sectional area of the seat 26 but in accordance with standard practice, the diaphragm 22 may be made to have an effective area equal to the effective area of the valve seat 26. With this arrangement, the upward thrust upon the diaphrgram 22 equalizes the downward thrust upon the central portion of the diaphragm 23, and hence there remains a resultant force upon the valve disk and applied by the diaphragm 23, equal only to the pressure exerted by the hydrostatic head upon the outer portion of said diaphragm. There may be a pressure above or below atmospheric acting in the chamber D upon the portion of the valve disk 37 exposed through the seat 26, but this pressure, whether above or below atmospheric, will be communicated through the ports 45 and the bore 28 of the tube 27 to the interior of the top housing 18, thereby acting upon the upper surface of the diaphragm 22 in opposition to the force exerted on the underside of the valve disk 37. Hence, any vacuum or pressure existent in the outlet conduit will have its effect upon the valve disk 37 and the diaphragm 23 equalized by its effect upon the diaphragm 22.

There is also present the force exerted by the weights 63 through the bar 62 and the arm 56 upon the rod 58 and thence through the plug 46 to the tube 27. Obviously, by suitably selecting the mass of the weights 63, any desired pre-determined loading may be applied to the diaphragm 23 and the valve disk 37 so that the latter moves upwardly to lift the disk 37 from the seat 26 only when a pre-determined hydrostatic head has been obtained. Since the valve is otherwise completely equalized, it will open and close solely in response to hydrostatic head and will function to maintain water at the desired level within the treater 65 or within the water leg or siphon 67. Fluctuation of the gas pressure in the upper portion of the treater will have no effect since its effect upon the valve is completely equalized by the diaphragms 22 and 23, and the valve will remain balanced even after it has opened and flow through the outlet 15 has commenced. Any pressure created in the chamber D when the valve is open will likewise be communicated through the bore 28 of the tube 27 into the top housing 18, and hence, the valve is completely balanced in all positions.

It is to be noted that as the arm 56 swings in a vertical arc, the block 57 and the upper end of the rod 58 will undergo slight lateral movement. The convex underside of the nut 59 makes provision for such rocking action while continuing to transmit to the plug 45 and the tube 27 the downward thrust created by the weights 63. At the same time, the rocking engagement between the rod 58 and the tube 27 permits the tube itself to undergo slight tilting or lateral movement so that the valve disk 37 is enabled to engage the valve seat 26 securely under all conditions. On occasion, the seat 26 and the tube 27 may not be exactly perpendicular to one another, or for various other reasons, the disk 37 may need to tilt slightly in engaging the seat 26 completely. The flexible supporting of the disk 37 and the flexible linkage between the disk and the weight arm permits such tilting while still utilizing the downward thrust through the rod 58 to hold the disk against the valve seat.

On occasion, it is desirable to open the valve manually, and this is accomplished by merely raising the arm 62. As the rod 58 is lifted by upward movement of the arm, the nut 59 engages the underside of the flange 44 and lifts the disk 37 from the seat 26. Occasionally, foreign matter gets caught between the disk and the seat, it becomes desirable to flush the valve, or to open or close it for other reasons. It is apparent that this is readily accomplished by manual manipulation of the arm 62, and that as soon as the arm is released, the valve returns immediately to automatic operation.

It is also to be noted that the point of engagement or transference of load between the rod 58 and the diaphragm valve disk structure is at a point spaced horizontally below the plane of engagement between the valve disk and the valve seat. This means that all toggle action between the arm 56 and the valve disk 37 is eliminated and that a stable rather than an unstable linkage is obtained. No matter what the load applied to the rod 58, or the degree of tilting between the rod 58 and the valve disk 37, there is at no time applied a load which will tend to tilt the valve disk from engagement with the seat 26. On the contrary, the valve disk is always urged or tilted toward the seat to insure closing of the valve. If the point of load transfer between the arm 56 and the disk 37 were above the plane of engagement of the disk with the valve seat, it is apparent that under some conditions and in some positions of the arm 56, there might be a sizable lateral force component which would tend to lift or tilt the disk from engagement with the seat. With the present structure, no matter what the position of the arm 56 or the magnitude of the load applied, or the position of the disk 35, all the force components applied tend to move the disk into engagement with the seat.

It is emphasized that the application of the valve illustrated in Fig. 4 is for the purposes of explanation only and that the valve is not limited to use with emulsion treaters. The valve serves very admirably for controlling both the water and the clean oil levels in an emulsion treater, but it finds application in any type of vessel, container, or conduit, in which it is desired to maintain a certain liquid level. It is often desirable to maintain a certain level in vertical heat exchangers in order to enhance the heat transfer characteristics, and the valve finds particular application in this instance. Many other applications and uses are completely obvious.

Nor is the use of the valve to be limited to vessels operating under pressure. It functions equally well with vessels operating under a partial vacuum or with vessels operating at atmospheric pressure. Of course, the utilization of the gas equalizing line 69 is always advisable since any closed vessel or container may undergo slight pressure changes, and since the incorporation of the equalizing line 69 insures complete balancing and equalization of the valve at all times.

It is to be noted that only one valve seat and one valve disk is necessary so that the manufacturing difficulties and operating draw-backs encountered in connection with double-seated valves are avoided. The structure incorporates in one unit the discharge valve and the control diaphragm for such valve along with structural provisions for balancing of the valve. It is apparent that a suitable spring structure may be employed in place of the weight arm 62, but the latter has been found advantageous because of the ability of the operator to open or close the valve manually when so desired.

A modification of the valve is shown in Fig. 5 in which the positions of the housing inlet and outlet are reversed. Thus, 15 becomes the inlet and 14' the outlet. The modified form is constructed substantially the same as the first form of the invention except that the ports 45 are omitted, the chamber A receives the pipe 69 through an inlet fitting 71, and the chamber B is placed in communication with the outlet 14' through the port 70, a short pipe 72, and a port 73 in the outlet 14' and to which the pipe 73 is connected. With this arrangement, the chamber A is adapted to be placed in communication with the gas space of a vessel to which the valve is connected, and the chamber B is placed in communication with the outlet line.

This valve also is completely balanced at all times and functions substantially the same as the first form described. Because of the smaller area of the diaphragm 23 exposed to the inlet conduit, some sensitivity may be lost.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A diaphragm valve including, a housing having an inlet port and an outlet port, a valve seat in the housing, one of the ports communicating with the interior of the housing through the valve seat and the other port communicating with the interior of the housing around the valve seat, a diaphragm in the housing, a valve member carried by the diaphragm and adapted to engage the seat to close off the inlet port from the outlet port, the diaphragm being arranged for pressure response and movement in the housing, pressure on one side of the diaphragm moving the valve member toward the valve seat and pressure upon the opposite side of the diaphragm moving the valve away from the seat, the latter side of the diaphragm being exposed to the inlet port, a second diaphragm in the housing having an effective pressural area equal to the effective pressural area of the valve seat, means constantly urging the valve member toward the valve seat, the second diaphragm forming with the first diaphragm a chamber in the housing completely isolated from the inlet and outlet ports, a pressure connection to said chamber, the second diaphragm having one side exposed at all times to the outlet port, and means for transferring movement of the second diaphragm to the valve member.

2. A diaphragm valve as set forth in claim 1, wherein the means for transferring a movement of the second diaphragm to the valve member is a rigid connection between the first diaphragm and the second diaphragm.

3. A diaphragm valve as set forth in claim 1, wherein the means for transferring a movement of the second diaphragm to the valve member is a hollow tube extending through and connected between the first and second diaphragms.

4. A diaphragm valve as set forth in claim 1, wherein the means for transferring a movement of the second diaphragm to the valve member includes a hollow tube extending through and connected between the first and second diaphragms, and the means urging the valve member toward the valve seat includes an elongate rod extending through the first diaphragm and the valve member, the rod having a convex lower end, the lower end of the tube having a closed bottom against which the convex lower end of the rod bears.

5. A diaphragm valve as set forth in claim 1, wherein the means urging the valve member toward the valve seat includes an elongate rod extending through the first diaphragm and the valve member, the rod having a convex lower end, a sleeve depending from the valve member and having a closed bottom against which the convex lower end of the rod engages, an arm rotatably mounted in the housing upon a shaft extending transversely of the housing and having one end projecting therefrom, the arm being pivotally connected to the elongate rod, and a weight bar secured upon the projecting end of the shaft.

6. A diaphragm valve as set forth in claim 1, wherein the means for transferring a movement of the second diaphragm to the valve member includes a hollow tube extending through and connected between the first and second diaphragms, and the means urging the valve member toward the valve seat includes an elongate rod extending through the first diaphragm and the valve member, the rod having a convex lower end, the lower end of the tube having a closed bottom against which the convex lower end of the rod bears, and ports in the lower end of the tube, the upper end of the tube being open so as to place the second diaphragm in communication with the housing outlet.

7. A diaphragm valve as set forth in claim 1, wherein the means urging the valve member toward the valve seat includes an elongate rod extending through the first diaphragm and the valve member, the rod having a convex lower end, a sleeve depending from the valve member and having a closed bottom against which the convex lower end of the rod engages, an arm rotatably mounted in the housing upon a shaft extending transversely of the housing and having one end projecting therefrom, the arm being pivotally connected to the elongate rod, and a weight bar secured upon the projecting end of the shaft, the point of pivotal connection of the arm to the elongate rod being above the horizontal plane of the valve seat, and the point of engaging between the lower end of the rod and the closed bottom of the sleeve being below such plane.

8. A diaphragm valve including, a housing having an inlet port and an outlet port, an upstanding sleeve in the housing leading to the outlet port, the inlet port communicating with the housing around the sleeve, a valve seat on the upper end of the sleeve, a first diaphragm extending transversely of the housing above the valve seat, a valve disk carried by the first diaphragm, the diaphragm being arranged for pressure response and movement in the housing, pressure on one side of the diaphragm moving the valve member toward the valve seat and pressure upon the opposite side of the diaphragm moving the valve member away from the seat, the latter side of the diaphragm being exposed to the inlet port, a second diaphragm extending transversely of the housing above the first diaphragm and enclosing in the housing with the first diaphragm a pressure chamber completely isolated from the inlet and outlet ports, a pressure connection to the pressure chamber, the effective pressural area of the second diaphragm being equal to the effective pressural area of the valve seat, a pressure communicating member extending through the two diaphragms, a loading member in the housing constantly urging the valve disk toward the valve seat, the second diaphragm being secured to said communicating member, and the pressure communication member extending between the housing outlet and the upper side of the second diaphragm.

9. A diaphragm valve as set forth in claim 8, wherein the pressure communication member is a tube having an open upper end extending through and secured to the second diaphragm and a lower end with a closed bottom extending through and secured to the first diaphragm and the valve disk, the tube having ports between the housing outlet and the bore of the tube, and the loading member is an elongate rod extending through the tube, the lower end of the rod carrying an enlarged foot with a convex bottom engaging the closed bottom of the tube, and a stop in the tube above the rod foot limiting upward movement of the foot and rod in the tube.

10. A diaphragm valve including, a housing having an inlet port and an outlet port, a sleeve extending into the housing from one of the ports and having a valve seat on its inner end, the other port communicating through the housing with the exterior of the sleeve, a first diaphragm extending across the housing and having one side constantly exposed to the inlet and outlet ports, a valve disk carried by the first diaphragm and adapted to engage the seat to close off the inlet port from the outlet port, a second diaphragm in the housing having one side forming a chamber in the housing with the opposite side of the first diaphragm, said chamber being completely isolated from the inlet and outlet ports, said second diaphragm having an effective pressural area equal to the effective pressural area of the valve seat, means constantly urging the valve disk toward the valve seat, a pressure connection to the chamber, the second diaphragm having one side exposed at all times to the outlet port, and means for transferring movement of the second diaphragm to the valve disk.

11. A diaphragm valve including, a housing having an inlet port and an outlet port, a sleeve extending into the housing from one of the ports and having a valve seat on its inner end, the other port communicating through the housing with the exterior of the sleeve, a first diaphragm extending across the housing and having one side constantly exposed to the inlet and outlet ports, said first diaphragm having an effective pressural area greater than the effective pressural area of the valve seat, a valve disk carried by the first diaphragm and adapted to engage the seat to close off the inlet port from the outlet port, a second diaphragm in the housing having one side forming a chamber in the housing with the opposite side of the first diaphragm, said chamber being completely isolated from the inlet and outlet ports, said second diaphragm having an effective pressural area equal to the effective pressural area of the valve seat, means constantly urging the valve disk toward the valve seat, a pressure connection to the chamber, the second diaphragm having one side exposed at all times to the outlet port, and means for transferring movement of the second diaphragm to the valve disk.

12. A diaphragm valve including, a housing having an inlet port and an outlet port, a sleeve extending into the housing and defining therein a flow space within the sleeve and an annulus extending substantially entirely around the sleeve, one port being in constant communication with the flow space and the other port being in constant communication with the annulus, a valve seat on the inner end of the sleeve, a first diaphragm in the housing having one side constantly exposed to the flow space and the annulus, a valve disk carried by the first diaphragm and adapted to engage the seat to close off the inlet port from the outlet port, a second diaphragm in the housing having one side forming a chamber in the housing with the opposite side of the first diaphragm, said chamber being completely isolated from the inlet and outlet ports, said second diaphragm having an effective pressural area equal to the effective pressural area of the valve seat, means constantly urging the valve disk toward the valve seat, a pressure connection to the chamber, the second diaphragm having one side exposed at all times to the outlet port, and means for transferring movement of the second diaphragm to the valve disk.

13. A diaphragm valve including, a housing, a valve seat in the housing, the housing having an outlet port opening thereinto through the valve seat and an inlet port opening thereinto around the valve seat, a first diaphragm in the housing having one side constantly exposed to the inlet and outlet ports, a valve member carried by the first diaphragm for engaging the seat, means constantly urging the valve member toward the seat, a second diaphragm in the housing having one side forming a chamber in the housing with the opposite side of the first diaphragm, said chamber being completely isolated from the inlet and outlet ports, said second diaphragm having an effective pressural area approximately equal to the effective pressural area of the valve seat, a pressure connection to the chamber, the second diaphragm having its opposite side exposed at all times to the outlet port, and means for transferring movement of the second diaphragm to the valve member.

14. A diaphragm valve as set forth in claim 1, wherein the means urging the valve member toward the valve seat includes an elongate rod extending through the first diaphragm, the rod having a convex lower end, and a sleeve carried by the valve member and having a bottom against which the convex lower end of the rod engages.

References Cited in the file of this patent

UNITED STATES PATENTS

| | | |
|---|---|---|
| 877,003 | Schulze | Jan. 21, 1908 |
| 880,402 | Reynolds | Feb. 25, 1908 |
| 1,184,940 | Fulton | May 30, 1916 |
| 1,396,501 | Brooks | Nov. 8, 1921 |
| 1,521,354 | Burns | Dec. 30, 1924 |
| 1,770,912 | Clapp | July 22, 1930 |
| 1,841,433 | Finnegan | Jan. 19, 1932 |
| 1,851,422 | Durando | Mar. 29, 1932 |
| 1,926,016 | Savage | Sept. 5, 1933 |
| 1,944,424 | Gleeson | Jan. 23, 1934 |
| 2,146,092 | Raymond | Feb. 7, 1939 |
| 2,186,024 | Sler | Jan. 9, 1940 |
| 2,388,868 | Ray | Nov. 13, 1945 |
| 2,472,070 | Garretson | June 7, 1949 |
| 2,497,549 | Heller | Feb. 14, 1950 |
| 2,516,996 | Jensen | Aug. 1, 1950 |
| 2,526,972 | Ray | Oct. 24, 1950 |
| 2,670,006 | Parks | Feb. 23, 1954 |

FOREIGN PATENTS

| | | |
|---|---|---|
| 9,977 | Germany | June 8, 1888 |
| 819,200 | France | July 5, 1937 |